United States Patent [19]

Mori

[11] 4,066,357

[45] Jan. 3, 1978

[54] PROCESS CAMERA

[76] Inventor: Yutaka Mori, 1-15-5 Zoshigaya, Toshima, Tokyo 171, Japan

[21] Appl. No.: 699,166

[22] Filed: June 23, 1976

[30] Foreign Application Priority Data

June 24, 1975 Japan .................................. 50-77711
June 24, 1975 Japan .................................. 50-77712
June 24, 1975 Japan .................................. 50-77713

[51] Int. Cl.² ........................................... G03B 27/70
[52] U.S. Cl. .................................................. 355/66
[58] Field of Search ................... 355/77, 66, 65, 60, 355/39, 18, 40, 57, 44, 53, 43, 45

[56] References Cited

U.S. PATENT DOCUMENTS

| 1,808,274 | 6/1931 | Webster | 355/45 |
| 2,940,358 | 6/1960 | Rosenthal | 355/66 |
| 3,101,024 | 8/1963 | Huebner | 355/60 |
| 3,380,337 | 4/1968 | Dacquay | 355/60 |
| 3,398,638 | 8/1968 | Frohlich | 355/60 |

FOREIGN PATENT DOCUMENTS

| 1,161,305 | 3/1958 | France | 355/65 |
| 41,199 | 10/1965 | Germany | 355/66 |
| 614,683 | 12/1948 | United Kingdom | 355/66 |

*Primary Examiner*—Donald A. Griffin

[57] ABSTRACT

A process camera having a film mounting plate and a manuscript mounting plate arranged generally in a same plane. At least one of the plates is pivotably mounted on a base.

3 Claims, 5 Drawing Figures

PROCESS CAMERA

BRIEF SUMMARY OF THE INVENTION

The present invention relates to a process camera and in particular to a process camera which has a film mounting plate and a manuscript mounting plate arranged generally in a same plane.

As is well known, a camera used as a process camera is a particular, large sized camera and is required to have high performance and high workability.

In prior process cameras of floor and lateral types, a manuscript mounting plate and a film mounting plate are arranged in different planes, respectively and therefore, upon mounting or removing of manuscript and film, operator must run from the manuscript mounting plate to the film mounting plate or the works must be carried out by two operators. Further, to have such a structure, its shape becomes large and therefore its installation requires a large area and its cost is expensive in manufacture.

There is a process camera having a manuscript mounting plate and a film mounting plate arranged generally in a same horizontal plane. However, in such a process camera, it is difficult to have strict focussing and positioning, because their works are performed by looking at the manuscript and film mounting plates from the upper part.

Therefore, it is an object of the present invention to provide a process camera which can eliminate various defects in the prior process camera.

It is another object of the invention to provide a process camera which arranges a manuscript mounting plate and a film mounting plate in the same plane and which constitutes to be capable of rotating at least one of the manuscript and film mounting plates.

It is a further object of the invention to provide a process camera for offset printing in which a manuscript mounting plate and a film mounting plate are pivotably mounted and elements for changing direction of optical axis are provided opposite the plates, respectively.

It is a still further object of the invention to provide a process camera for relief printing in which a manuscript mounting plate is rotatably arranged and an element for changing direction of optical axis is positioned on the optical axis between a film mounting plate and a process lens.

It is another object of the invention to provide a process camera for relief and offset printing which has a film mounting plate rotatably mounted and an element for changing direction of optical axis removably provided on the optical axis between the film mounting plate and a process lens.

With first aspect of the invention, there may be provided an improved process camera which comprises a base, a film mounting plate arranged on the base, a manuscript mounting plate arranged on the base and in the same plane as the film mounting plate, at least one of the film and manuscript mounting plates being pivotable itself, at least one element for changing direction of optical axis consisting of mirror, prism or the like, and a process lens located on the optical axis from the film mounting plate to the manuscript mounting plate.

With second aspect of the invention, there may be provided an improved process camera for offset printing which comprises a framework, a film mounting plate arranged on the framework, a manuscript mounting plate mounted in the framework and in the same vertical plane as the film mounting plate, the plates being pivotable to be capable of arranging in a plane perpendicular to the vertical plane, two elements for changing direction of optical axis disposed opposite to each other in front of the mounting plates which are in the vertical plane, and a process lens located on the optical axis from the film mounting plate to the manuscript mounting plate.

With third aspect of the invention, there may be provided an improved process camera for relief printing which comprises a base, a film mounting plate mounted on the base, a manuscript mounting plate pivotably mounted on the base, and an element for changing direction of optical axis disposed opposite to the film mounting plate so as to exist on the optical axis from the film mounting plate to a process lens which is located on the optical axis from the film mounting plate to the manuscript mounting plate.

With fourth aspect of the invention, there may be provided an improved process camera for relief and offset printings which comprises a base, a film mounting plate pivotably mounted on the base, a manuscript mounting plate mounted on the base and in the same horizontal plane as the film mounting plate, and two elements for changing direction of optical axis disposed opposite to the film and manuscript mounting plates, the one element opposite the film mounting plate being removable from the optical axis between the film mounting plate and a process lens which is located on the optical axis from the film mounting plate to the manuscript mounting plate.

BRIEF DESCRIPTION OF THE DRAWING

The above and other objects and features of the invention will appear more fully hereinafter from a consideration of the following description taken in connection with the accompanying drawing wherein like reference numerals designate corresponding parts in the several views.

In the drawing:

Referring to FIG. 1, there is shown a process camera of vertical type suitable for offset printing. Reference numeral 1 designates a base or framework which may have a suitable shape. A manuscript mounting plate 2 and a film mounting plate 3 are arranged in the framework 1 and in a generally idendical vertical plane. The plates 2 and 3 pivotable to be capable of disposing them on a plane (horizontal) perpendicular to the above vertical plane. In front of both the mounting plates 2 and 3 are disposed two elements 4 and 5 for changing direction of optical axis consisting of mirror, prism or the like so as to oppose each other. A process lens 7 is located on a optical axis 6 from the manuscript mounting plate 2 to the film mounting plate 3.

Figure 1:
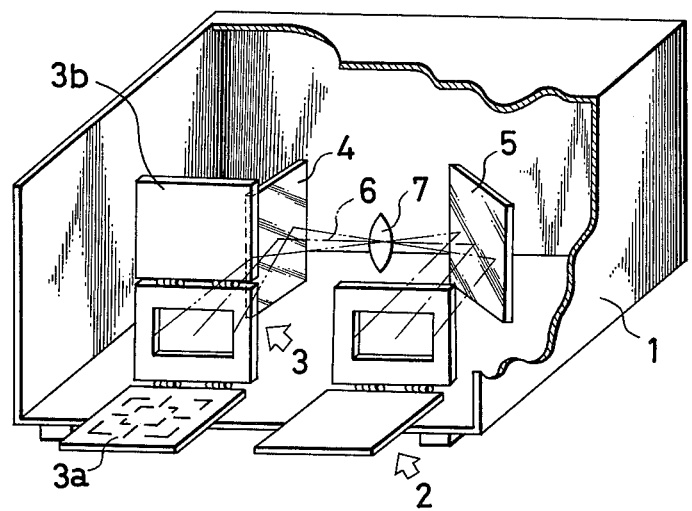
FIG. 1 is a partially cutway view of a first embodiment of a process camera in accordance with the invention.

The film mounting plate 3 comprises a print glass 3b which acts such as a springboard and a vacuum plate 3a which rotates in front direction, as shown in FIG. 1. A vacuum device (not shown) for placing a film in contact with the vacuum plate 3a is mounted in such a manner similar to the well known device.

Drive devices (not shown) of axial direction for focussing are provided on the process lens 7, the manuscript mounting plate 2 and the element 5 for changing direction of optical axis, respectively. The drive devices for the manuscript mounting plate 2 and the element 5 are constructed so that they are operatively connected to each other to have identical amounts of movement therebetween.

In operation of the above embodiment, insertion of a manuscript to be photographed is carried out by rotating the manuscript mounting plate 2 in front direction so as to maintain a surface for mounting the manuscript in a horizontal position as shown in FIG. 1. After the above insertion of the manuscript, the manuscript mounting plate 2 is rotated to maintain in the original vertical plane. Upon photographing, the print glass 3b is sprung upwardly after focussing and then a film is placed in contact with the vacuum plate 3a through the vacuum device. In this case, the focussing is carried out by the drive devices of the process lens 7, the manuscript mounting plate 2 and the element 5.

With the process camera mentioned above, operator can realize the positioning of the manuscript and the focussing in a hight of his eyes, whereby he can obtain photographing of high accuracy. As understood from the above description, the operator can realize the insertion of manuscript and film in the identical plane.

Figure 2:
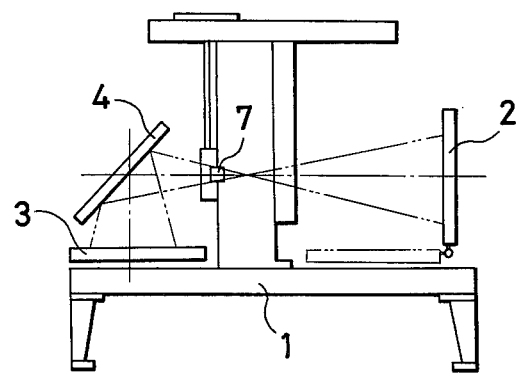
FIG. 2 is a schematic illustration showing a second embodiment of a process camera in accordance with the invention.

Referring to FIG. 2, there is shown a process camera for relief printing in which a manuscript mounting plate 2 and a film mounting plate 3 are disposed in an identical plane and below an element for changing direction of optical axis.

On a base 1 is horizontally disposed the film mounting plate 3 above which the element 4 consisting of mirror, prism or the like is slantly disposed. The element 4 for changing direction of optical axis is arranged on the main axis of a process lens 7. The manuscript mounting plate 2 is rotatably mounted so that upon insertion of the manuscript, it is generally in the same plane (horizontal) as the film mounting plate 3 and that upon photographing it is located on a main axis (horizontal) of the process lens 7.

As in other process camera, the film mounting plate 3 is disposed on the base 1 by mounting a glass plate or the like and includes a vacuum device (not shown) for placing a film in contact therewith. The process lens 7 and the manuscript mounting plate 2 have each drive mechanism (not shown) driven to a direction of main axis to focuss.

Figure 3:
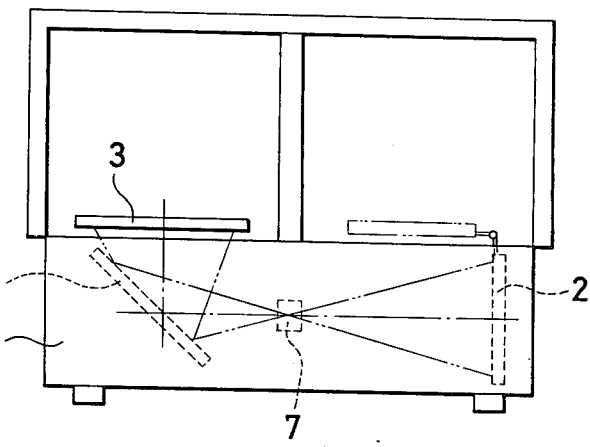
FIG. 3 is a schematic illustration showing a third embodiment of a process camera in accordance with the invention.

Referring to FIG. 3, there is shown a process camera for relief printing in which a manuscript mounting plate 2 and a film mounting plate 3 are disposed in an identical plane and above an element 4 for changing direction of optical axis. In this emebodiment, the structure is similar to that of the embodiment shown in FIG. 2, except that a direction of reflex axis and a rotational direction of the manuscript mounting plate differ from the embodiment shown in FIG. 2.

In operation of the embodiment shown in FIGS. 2 and 3, a manuscript is mounted on the manuscript mounting plate 2 disposed in a horizontal plane and generally in the same plane as the film mounting plate 3. The mounting plate 2 which mounted the manuscript is rotated upon photographing and is arranged to become perpendicular to the main axis of the process lens 7. In this case, the focussing is realized by the drive mechanisms of the process lens 7 and the manuscript mounting plate 2. Correction of position of the manuscript is realized by disposing the manuscript mounting plate 2 horizontally.

Figure 4:
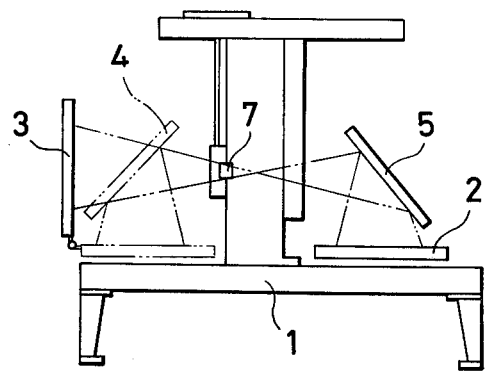
FIG. 4 is a schematic illustration showing a fourth embodiment of a process camera in accordance with the invention.
Figure 5:
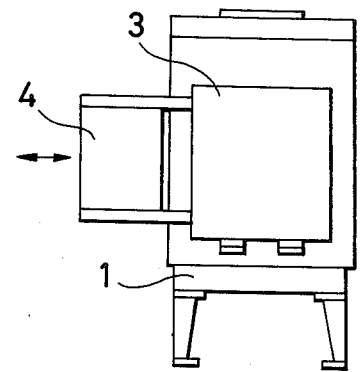
FIG. 5 is a schematic illustration showing an arrangement of an element for changing direction of optical axis of the process camera in FIG. 4.

Referring to FIGS. 4 and 5, there is shown a process camera for relief and offset printings in which a film mounting plate is pivotably mounted.

On a base 1 is horizontally disposed a manuscript mounting plate 2 above which an element 5 for changing direction of optical axis is slantly provided. The element 5 is on the main axis (horizontally) of a process lens 7. A film mounting plate 3 is rotatably mounted in such a manner that it is generally in the same plane as the manuscript mounting plate 2, upon photographing for offset printing and that it is located on the main axis of the process lens 7, upon photographing for relief printing. An element 4 for changing direction of optical axis consisting of mirror, prism or the like is arranged to be capable of interposing on an optical axis between the process lens 7 and the film mounting plate 3. In this embodiment, the element 4 is slidably mounted as shown in FIG. 5.

As in other process camera, the film mounting plate 3 is disposed on the base 1 by mounting a glass plate or the like and includes a vacuum device (not shown) for placing a film in contact therewith. The process lens 7, the manuscript mounting plate 2 and the element 5 for changing direction of optical axis have a drive mechanism (not shown) driven to a direction of the main axis to focus the camera. The drive mechanisms of the manuscript mounting plate 2 and the element 5 are operatively connected to have identical amount of drive therebetween.

In operation of the above embodiment, a film is set on the film mounting plate 3 by arranging the latter horizontally so as to be in the same plane as the manuscript mounting plate 2. Upon photographing for offset printing, the film mounting plate 3 is supported in such a condition and the element 4 for changing direction of optical axis is arranged on the main axis of the process lens 7. Upon photographing for relief printing, the film mounting plate 3 which has a film is rotated to be arranged in a position that it becomes perpendicular to the main axis of the process lens 7. In this case, the element 4 for changing direction of optical axis is moved in slide so as to remove from the main axis of the processss lens 7. Focussing upon photographing is realized by drive mechanisms of the process lens 7, the manuscript mounting plate 2 and the element 5 for changing direction of optical axis.

With this embodiment, a process camera is constructed for relief and offset printings only be removing the element 4 for changing direction of optical axis disposed at the side of the film mounting plate 3, from the main axis of the process lens 7.

Throughout the embodiments according to the invention shown in FIGS. 1 to 4, the process camera is compact in shape and is inexpensive in manufacturing cost. The most suitable height for operation must be obtained because the height of the base can be free to design by arranging the process lens above the manuscript mounting plate and the film mounting plate.

As many apparently widely different embodiments of this invention may be made without departing from the spirit and scope thereof, it is to be understood that the invention is not limited to the specific embodiments thereof except as defined in the appended claims.

What is claimed is:

1. A process camera comprising:
    a base;
    a film mounting plate attached to said base;
    a manuscript mounting plate attached to said base and in a common plane with said film mounting plate;
    means for rotating one of said plates with respect to said plane from a first position in said plane to a second position out of said plane;
    lens means having an optical path parallel to, and spaced from, said plane;
    first reflective means for bending the optical path from the other of said plates through said lens means; and
    second reflective means for bending the optical path from said one plate in said first position through said lens, said second reflective means being movable out of the optical path of said lens;
    whereby said one plate in said second position is in said optical path of said lens.

2. The camera is claimed in claim 1, wherein said plane is horizontal.

3. The camera is claimed in claim 1, further comprising means for rotating said other plate out of said plane.

* * * * *